United States Patent
Reddy et al.

(10) Patent No.: US 7,352,751 B2
(45) Date of Patent: Apr. 1, 2008

(54) ACCOUNTING FOR LINK UTILIZATION IN SCHEDULING AND BILLING

(75) Inventors: Veeranarayana A. Reddy, Cranberry Township, PA (US); Joseph A. Hook, Baden, PA (US); Jeremy William Horner, Cranberry Township, PA (US); Jeffrey Schulz, Valencia, PA (US)

(73) Assignee: Ericsson AB, Stockholm (SE)

( * ) Notice: Subject to any disclaimer, the term of this patent is extended or adjusted under 35 U.S.C. 154(b) by 801 days.

(21) Appl. No.: 10/642,310

(22) Filed: Aug. 18, 2003

(65) Prior Publication Data

US 2005/0041668 A1 Feb. 24, 2005

(51) Int. Cl.
*H04L 12/28* (2006.01)
*H04L 12/56* (2006.01)

(52) U.S. Cl. .................................. 370/395.21
(58) Field of Classification Search ................ 370/395, 370/389–392, 252, 470–472, 476, 235–238, 370/355, 465, 241, 474, 258; 398/130, 158, 398/54; 709/238, 231, 220, 223, 226; 714/758, 714/799, 761; 455/452, 405, 62, 557
See application file for complete search history.

(56) References Cited

U.S. PATENT DOCUMENTS 4,893,302 A * 1/1990 Hemmady et al. ........... 370/427
6,697,334 B1 * 2/2004 Klincewicz et al. ......... 370/238
6,934,259 B2 * 8/2005 Klincewicz et al. ......... 370/238
7,035,267 B1 * 4/2006 Zhou et al. ............. 370/395.72
7,149,432 B1 * 12/2006 Smith et al. ................. 398/158

OTHER PUBLICATIONS

Kung et al, Use of Link-by-Link flow Control in Maximizing ATM Network Performance,. Aug. 1993, Proceedings IEEE Hot Interconnects Symposium, '93, pp. 1-12.*
David Bean, Fiber Selection Guide for Premises Networks, May 1998, Corning Incorporated, Corning, pages: May 1998.*

* cited by examiner

*Primary Examiner*—Wing Chan
*Assistant Examiner*—Prenell Jones
(74) *Attorney, Agent, or Firm*—Ansel M. Schwartz

(57) ABSTRACT

An apparatus for transferring data in a telecommunications network. The apparatus includes a memory in which a packet memory length is stored. The apparatus includes a mechanism for determining a link length for the packet that will be sent into the network based on the memory length and at least one parameter, where the link length correctly corresponds to the packet's physical line bandwidth usage in the network. The apparatus includes a mechanism for sending the packet having the link length to the network. A method for transferring data in a telecommunications network. The method includes the steps of storing in a memory a memory length of a packet. There is the step of determining a link length for the packet that will be sent into the network based on the memory length and at least one parameter, where the link length correctly corresponds to the packet's physical line bandwidth usage in the network There is the step of sending the packet having the link length to the network.

17 Claims, 2 Drawing Sheets

ACCOUNTING FOR LINK UTILIZATION IN SCHEDULING AND BILLING

FIELD OF THE INVENTION

The present invention is related to transferring data in a telecommunications network. More specifically, the present invention is related to transferring data in a telecommunications network by determining a link length for the packet that will be sent into the network based on the memory length and at least one parameter, where the link length correctly corresponds to the packet's physical line bandwidth usage in the network.

BACKGROUND OF THE INVENTION

In high end packet switches buffer management, scheduling, and billing functions will most likely be disconnected from any encapsulation, and framing functions, i.e. these two different sets of functions will most likely be implemented in different sub-components. In this scenario, a simple back-pressure based approach of running Scheduler slightly faster and then back-pressuring it to account for any encapsulation and framer overhead downstream will not give accurate scheduling. Billing information will also not be accurate without accounting for encapsulation and framing overhead downstream.

In the present invention, expressions are given to accurately account for any packet size changes to the downstream of the Scheduling and Billing functions to provide accurate scheduling and billing as per packet size sent on the physical line.

The present invention gives accurate scheduling and billing information as per packet size (bandwidth utilization) on the physical line, instead of basing schedule rates and billing information as per packet size that is stored in the switch internal memory. Also, with programmable parameters downstream packet size changes can be accounted for due to different encapsulation and framing methodologies.

SUMMARY OF THE INVENTION

The present invention pertains to an apparatus for transferring data in a telecommunications network. The apparatus comprises a memory in which a packet memory length is stored. The apparatus comprises means for determining a link length for the packet that will be sent into the network based on the memory length and at least one parameter, where the link length correctly corresponds to the packet's physical line bandwidth usage in the network. The apparatus comprises means for sending the packet having the link length to the network.

The present invention pertains to a method for transferring data in a telecommunications network. The method comprises the steps of storing in a memory a memory length of a packet. There is the step of determining a link length for the packet that will be sent into the network based on the memory length and at least one parameter, where the link length correctly corresponds to the packet's physical line bandwidth usage in the network. There is the step of sending the packet having the link length to the network.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
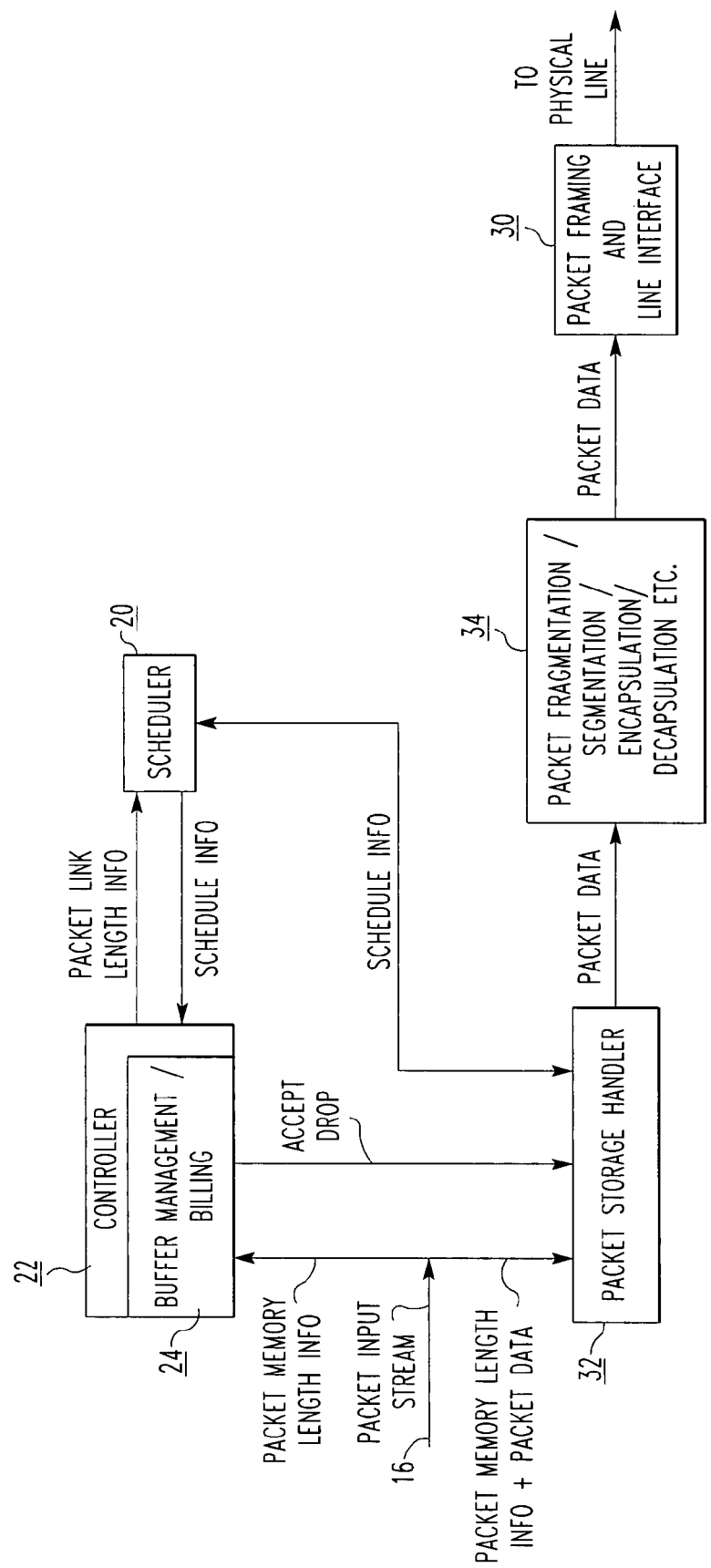
FIG. 1 is a schematic representation of the present invention.
Figure 2:
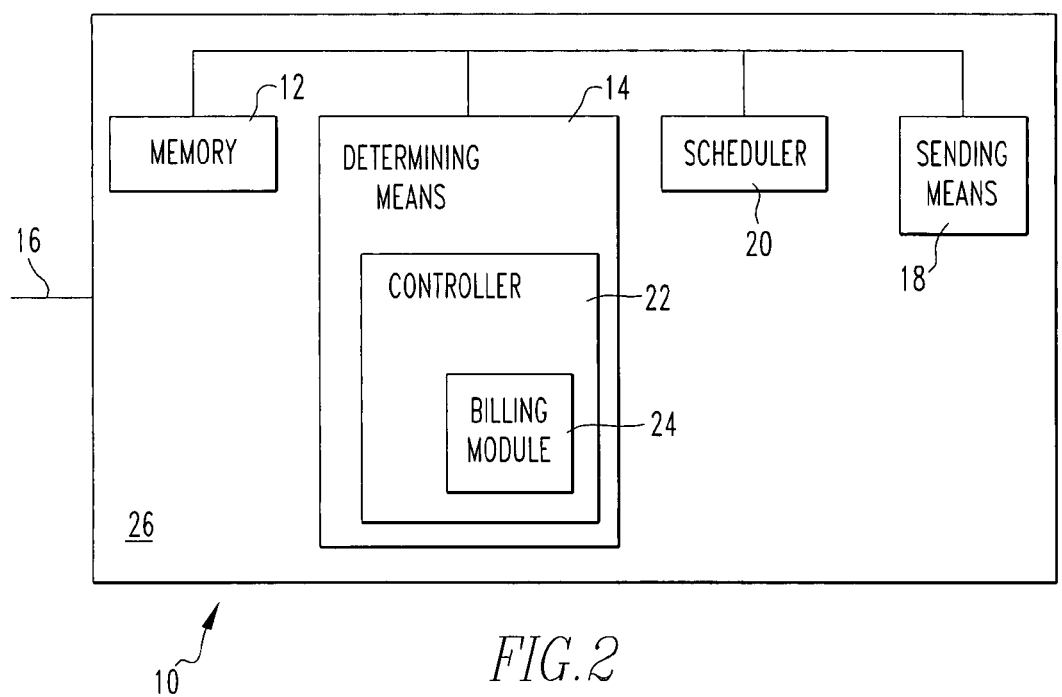
FIG. 2 is a block diagram of the present invention.

Referring now to the drawings wherein like reference numerals refer to similar or identical parts throughout the several views, and more specifically to FIGS. 1 and 2 thereof, there is shown an apparatus 10 for transferring data in a telecommunications network 16. The apparatus 10 comprises a memory 12 in which a packet memory length is stored. The apparatus 10 comprises means for determining a link length for the packet that will be sent into the network 16 based on the memory length and at least one parameter, where the link length correctly corresponds to the packet's physical line bandwidth usage in the network 16. The apparatus 10 comprises means for sending the packet having the link length to the network 16.

Preferably, the apparatus 10 includes a scheduler 20 for scheduling when the packet having the link length is to be sent into the network 16 based on the link length of the packet. The determining means 14 preferably includes a controller 22. Preferably, the controller 22 includes a billing module 24 for billing for the physical line bandwidth usage by the packet based on the link length of the packet.

The determining means 14 preferably determines the link length according to $$LinkLength = \left\lceil \frac{\{MemoryLength - HeaderSize + MPLSAdj\}}{FragmentSize} \right\rceil \times$$
$$\{HeaderSize + FrameOverhead\} +$$
$$\{MemoryLength - HeaderSize + MPLSAdj\} + LastFragmentPad$$

Where,

| | |
|---|---|
| LinkLength = | Length of the packet as seen on the physical line |
| MemoryLength = | Length of the packet as stored in the internal memory (= Header + Payload) |
| HeaderSize = | Length of the Header for this packet |
| MPLSAdj = | MPLS label push (positive value)/pop (negative value) amount |
| FragmentSize = | Required payload size of each packet fragment |
| FrameOverhead = | Number of bytes that will be added to each frame/packet in SONET/SDH framing |
| LastFragmentPad = | Number of bytes that need be added to the last fragment of a fragmented packet to make the fragment minimum size |

Preferably, the link length is determined by the controller 22 if the packet is an ATM cell according to LinkLength=MemoryLength+FrameOverhead.

The apparatus 10 preferably includes a port card 26 having the memory 12, determining means 14, sending means 18, scheduler 20 and billing module 24. Preferably, the memory 12 includes a packet storage handler 32 in communication with the billing module 24 and the scheduler 20. The sending means 18 preferably includes a packet framing and line interface 30 in communication with the packet storage handler 32.

Preferably, the sending means 18 includes a fragmentation/segmentation/encapsulation/decapsulation module 34 in communication with the packet storage handler 32 and the packet framing and line interface 30.

The controller 22 preferably frees the memory 12 based on the memory length of the packet that has been sent into the network 16. Preferably, the controller 22 determines memory length according to MemoryLength=LinkLength+
HeaderSize∓MPLSAdj−LastFragmentpad−
[NumFragments×(HeaderSize+FrameOverhead)]

Where $$NumFragments = \left\lceil \frac{LinkLength}{(HeaderSize + FragmentSize + FrameOverhead)} \right\rceil.$$

The present invention pertains to a method for transferring data in a telecommunications network 16. The method comprises the steps of storing in a memory 12 a memory length of a packet. There is the step of determining a link length for the packet that will be sent into the network 16 based on the memory length and at least one parameter, where the link length correctly corresponds to the packet's physical line bandwidth usage in the network 16. There is the step of sending the packet having the link length to the network 16.

Preferably, there is the step of scheduling when the packet having the link length is to be sent into the network 16 based on the link length of the packet. There is preferably the step of billing for the physical line bandwidth usage by the packet based on the link length of the packet. Preferably, the determining step includes the step of determining the link length according to $$LinkLength = \left\lceil \frac{\{MemoryLength - HeaderSize \pm MPLSAdj\}}{FragmentSize} \right\rceil \times$$
$$\{HeaderSize + FrameOverhead\} +$$
$$\{MemoryLength - HeaderSize \pm MPLSAdj\} + LastFragmentPad$$

Where,

| | |
|---|---|
| LinkLength = | Length of the packet as seen on the physical line |
| MemoryLength = | Length of the packet as stored in the internal memory (= Header + Payload) |
| HeaderSize = | Length of the Header for this packet |
| MPLSAdj = | MPLS label push (positive value)/pop (negative value) amount |
| FragmentSize = | Required payload size of each packet fragment |
| FrameOverhead = | Number of bytes that will be added to each frame/packet in SONET/SDH framing |
| LastFragmentPad = | Number of bytes that need be added to the last fragment of a fragmented packet to make the fragment minimum size. |

The determining step preferably includes the step of determining the link length for an ATM cell according to LinkLength=MemoryLength+FrameOverhead.

Preferably, the sending step includes the step of sending the packet to the network 16 through a port card 26 having the memory 12. There is preferably the step of freeing the memory 12 based on the memory length of the packet that has been sent into the network 16. Preferably, the freeing step includes the step of determining memory length according to MemoryLength=LinkLength+
HeaderSize∓MPLSAdj−LastFragmentpad−
[NumFragments×(HeaderSize+FrameOverhead)]

Where, $$NumFragments = \left\lceil \frac{LinkLength}{(HeaderSize + FragmentSize + FrameOverhead)} \right\rceil.$$

In the operation of the invention, in packet based switch port cards due to MPLS (Multi Protocol Label Switching) label push/pops, Ipv4 (Internet Protocol version 4) encapsulation of Ipv6 packets, packet fragmentation into smaller packets, packet segmentation into ATM (Asynchronous Transfer Mode) cells, SONET/SDH (Synchronous Optical Network/Synchronous Digital Hierarchy) framing overhead, and/or any other reason packet "link length" (length of the packet as seen on the physical link) is different than the packet "memory length" (length of the packet as stored in port card internal memory); when Buffer management (handling of packet storage buffers, and usage billing counters), packet Scheduling (sending out packets stored in internal memory at appropriate rates for different flows), and packet processing (MPLS label operations, framing etc) are happening in different sub-components of the port card.

In the apparatus, Buffer management, Scheduling, and cell/packet processing (segmentation, encapsulation, framing etc.) are implemented in separate components. A cell or packet comes into the system with a Header and Payload, which gets stored into the port card internal memory. This amount (Header+payload size) is termed as the "memory length" of that packet as that is what gets stored in the memory. Before the cell/packet is sent out onto the line different operations (MPLS label push/pops, packet fragmentation, packet segmentation into ATM cells, Ipv4 encapsulation of Ipv6 packet, SONET/SDH framing etc.,) are performed in the cell/packet processing components. To make the Scheduler and Billing modules account for the difference in packet length seen on the physical line versus the packet size stored in the internal memory, a few parameters are stored per each output port and per each flow, and based on these parameters and packet "memory length" packet "link length" will be calculated, and that is used in Scheduler and Billing modules. By using packet "link length" in Scheduler and Billing modules physical line bandwidth usage is correctly scheduled, and billed for.

Following expression calculates packet "link length" from packet "memory length", and output port and flow based information programmed into the port card. All values are in terms of number of bytes.

$$LinkLength = \left\lceil \frac{\{MemoryLength - HeaderSize \pm MPLSAdj\}}{FragmentSize} \right\rceil \times$$
$$\{HeaderSize + FrameOverhead\} +$$
$$\{MemoryLength - HeaderSize \pm MPLSAdj\} + LastFragmentPad$$

Where,

| | |
|---|---|
| LinkLength = | Length of the packet as seen on the physical line |
| MemoryLength = | Length of the packet as stored in the internal memory (= Header + Payload) |
| HeaderSize = | Length of the Header for this packet |
| MPLSAdj = | MPLS label push (positive value)/pop (negative value) amount |
| FragmentSize = | Required payload size of each packet fragment |
| FrameOverhead = | Number of bytes that will be added to each frame/packet in SONET/SDH framing |
| LastFragmentPad = | Number of bytes that need be added to the last fragment of a fragmented packet to make the fragment minimum size |

For an IPv6 packet coming in on a flow with "IPv4 encapsulation of IPv6' enabled, MemoryLength represents PDU (Payload Data Unit) as IPv6 header becomes part of the payload when IPv4 header is added on the top. Also, if the incoming datagram is an ATM cell, then the above expression will be simplified as follows:

LinkLength=MemoryLength+FrameOverhead.

Once the packet is scheduled out of the internal memory and billing counts are updated, memory used by that packets need to be freed up. Since, only "memory length" amount of bytes for that packet were stored into the memory as the packet came into the port card, the same number of bytes need to be freed from the memory. For this purpose, packet "memory length" needs to be re-calculated from the above computed packet "link length". The following expression calculates packet "memory length" from the packet "link length", and output port and flow based information programmed into the port card.

MemoryLength=LinkLength+
HeaderSize∓MPLSAdj−LastFragmentpad−
[NumFragments×(HeaderSize+FrameOverhead)]

Where, $$NumFragments = \left\lceil \frac{LinkLength}{(HeaderSize + FragmentSize + FrameOverhead)} \right\rceil.$$

The Packet Link length is calculated in the BufferManagement module and packet Memory length is calculated in the Scheduler.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for transferring data in a telecommunications network comprising:
a memory in which a packet memory length is stored;
means for determining a link length for the packet that will be sent into the network based on the memory length and at least one parameter, where the link length correctly corresponds to the packet's physical line bandwidth usage in the network, the determining means includes a controller, the controller includes a billing module for billing for the physical line bandwidth usage by the packet based on the link length of the packet; and
means for sending the packet having the link length to the network.

2. An apparatus as described in claim 1 including a scheduler for scheduling when the packet having the link length is to be sent into the network based on the link length of the packet.

3. An apparatus as described in claim 2 wherein the determining means determines the link length according to $$LinkLength = \left\lceil \frac{\{MemoryLength - HeaderSize + MPLSAdj\}}{FragmentSize} \right\rceil \times$$
$$\{HeaderSize + FrameOverhead\} +$$
$$\{MemoryLength - HeaderSize + MPLSAdj\} + LastFragmentPad$$

Where,

| | |
|---|---|
| LinkLength = | Length of the packet as seen on the physical line |
| MemoryLength = | Length of the packet as stored in the internal memory (= Header + Payload) |
| HeaderSize = | Length of the Header for this packet |
| MPLSAdJ = | MPLS label push (positive value)/pop (negative value) amount |
| FragmentSize = | Required payload size of each packet fragment |
| FrameOverhead = | Number of bytes that will be added to each frame/packet in SONET/SDH framing |
| LastFragmentPad = | Number of bytes that need be added to the last fragment of a fragmented packet to make the fragment minimum size. |

4. An apparatus as described in claim 3 wherein the link length is determined by the controller if the packet is an ATM cell according to LinkLength=MemoryLength+FrameOverhead.

5. An apparatus as described in claim 4 including a port card having the memory, determining means, sending means, scheduler and billing module.

6. An apparatus as described in claim 5 wherein the memory includes a packet storage handler in communication with the billing module and the scheduler.

7. An apparatus as described in claim 6 wherein the sending means includes a packet framing and line interface in communication with the packet storage handler.

8. An apparatus as described in claim 7 wherein the sending means includes a fragmentation/segmentation/encapsulation/decapsulation module in communication with the packet storage handler and the packet framing and line interface.

9. An apparatus as described in claim 8 wherein the controller frees the memory based on the memory length of the packet that has been sent into the network.

10. An apparatus as described in claim 9 wherein the controller determines memory length according to MemoryLength=LinkLength+
HeaderSize∓MPLSAdj−LastFragmentpad−
[NumFragments×(HeaderSize+FrameOverhead)]

Where $$NumFragments = \left\lceil \frac{LinkLength}{(HeaderSize + FragmentSize + FrameOverhead)} \right\rceil.$$

11. A method for transferring data in a telecommunications network comprising the steps of:

storing in a memory a memory length of a packet;

determining a link length for the packet that will be sent into the network based on the memory length and at least one parameter, where the link length correctly corresponds to the packet's physical line bandwidth usage in the network;

sending the packet having the link length to the network; and billing for the physical line bandwidth usage by the packet based on the link length of the packet.

12. A method as described in claim 11 including the step of scheduling when the packet having the link length is to be sent into the network based on the link length of the packet.

13. A method as described in claim 12 wherein the determining step includes the step of determining the link length according to $$LinkLength = \left\lceil \frac{\{MemoryLength - HeaderSize \pm MPLSAdj\}}{FragmentSize} \right\rceil \times$$
$$\{HeaderSize + FrameOverhead\} +$$
$$\{MemoryLength - HeaderSize \pm MPLSAdj\} + LastFragmentPad$$

Where,

| | |
|---|---|
| LinkLength = | Length of the packet as seen on the physical line |
| MemoryLength = | Length of the packet as stored in the internal memory (= Header + Payload) |
| HeaderSize = | Length of the Header for this packet |
| MPLSAdj = | MPLS label push (positive value)/pop (negative value) amount |
| FragmentSize = | Required payload size of each packet fragment |
| FrameOverhead = | Number of bytes that will be added to each frame/packet in SONET/SDH framing |
| LastFragmentPad = | Number of bytes that need be added to the last fragment of a fragmented packet to make the fragment minimum size. |

14. A method as described in claim 13 wherein the determining step includes the step of determining the link length for an ATM cell according to $$LinkLength = MemoryLength + FrameOverhead.$$

15. A method as described in claim 14 wherein the sending step includes the step of sending the packet to the network through a port card having the memory.

16. A method as described in claim 15 including the step of freeing the memory based on the memory length of the packet that has been sent into the network.

17. A method as described in claim 16 wherein the freeing step includes the step of determining memory length according to $$MemoryLength = LinkLength + HeaderSize \mp MPLSAdj - LastFragmentpad - [NumFragments \times (HeaderSize + FrameOverhead)]$$

Where, $$NumFragments = \left\lceil \frac{LinkLength}{(HeaderSize + FragmentSize + FrameOverhead)} \right\rceil.$$

* * * * *